April 2, 1929.  A. COHN  1,707,655
BAKING PAN
Filed Aug. 8, 1927
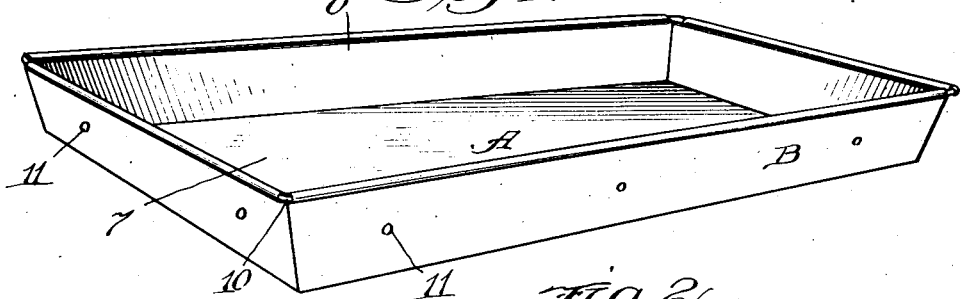
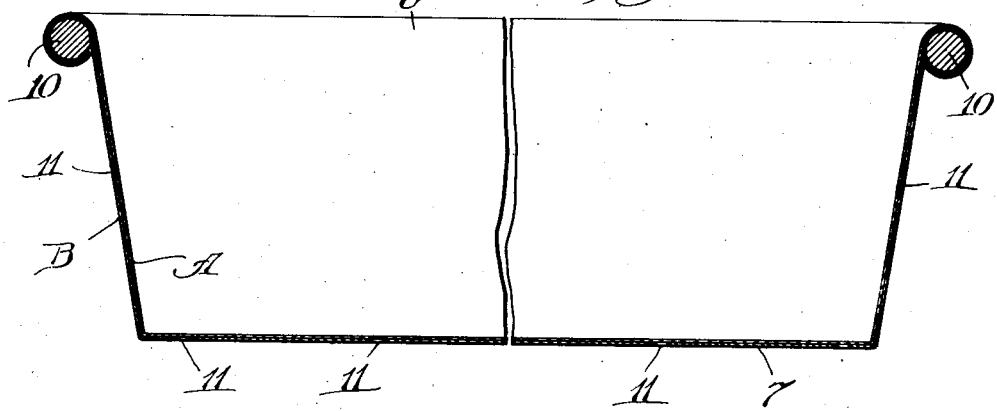
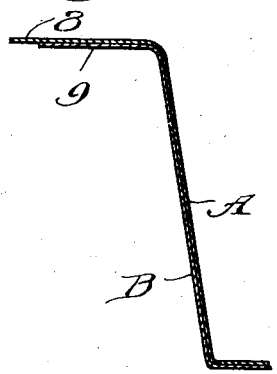 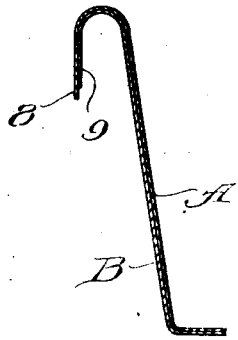 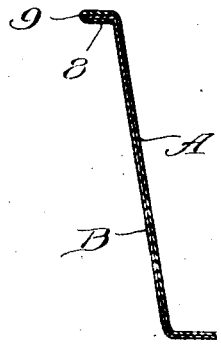
Inventor:
Albert Cohn

Patented Apr. 2, 1929.

1,707,655

UNITED STATES PATENT OFFICE.

ALBERT COHN, OF CHICAGO, ILLINOIS, ASSIGNOR TO CHICAGO METALLIC MFG. CO., OF CHICAGO, ILLINOIS, A CORPORATION OF ILLINOIS.

BAKING PAN.

Application filed August 8, 1927. Serial No. 211,335.

This invention relates to a pan for baking purposes, and is concerned with certain improvements in a bi-metallic article of this kind having two plies so arranged and combined as to produce with less expense a more serviceable cooking utensil.

The ordinary baking pan which is made from steel or tin has the disadvantage of requiring frequent greasing during its use, and also of becoming rusted through exposure to moisture. Other materials, such as aluminum, for example, are free from these objections, but, on account of their high cost or lack of strength, are unsuited for baking pans, particularly such as are used commercially. It is a primary object of this invention to provide a baking pan which combines an inner lining of aluminum and an outer shell of steel or tin, so as to utilize the desirable properties of each of these metals. It is not an easy matter, however, to provide a satisfactory two-ply pan of this character, due in part to the effect of heat upon air which is trapped between the plies. It is important that the pan in its entirety should retain, without impairment, its heat conduction properties, but in a bi-metallic structure, this is difficult due to the tendency of air between the plies to expand, thus separating the plies slightly with a consequent insulation of one from the other.

In regard to all such matters, the present invention aims to effect certain improvements, so that in a pan which utilizes an outer shell of tin or steel and an inner lining of aluminum, there will be contact at practically every point over the entire surfaces of these two plies, thus aiding in the conduction of heat. The pan so produced may also be formed by simple die operations which assure a uniform product at small expense. Objects such as these, as well as others which will hereinafter appear, are realized by my invention of which a suggestive embodiment is illustrated in the accompanying drawing in the manner following:

Figure 1 is a perspective view of the pan in its entirety;

Fig. 2 is an enlarged transverse section through the pan;

Fig. 3 is a fragmentary sectional view showing in assembled relation the two plies of the pan after the drawing operation;

Fig. 4 is a similar view showing the pan edge bent to receive the reinforcing wire; and Fig. 5 is a similar view illustrating a modification of the edge construction.

The pan herein set forth may be of any usual size or form which is suitable for baking purposes. In the present construction it is bi-metallic in that it comprises a lining A preferably of aluminum in association with an outer shell B of tin or steel. The pan comprises sides 6 and a bottom 7, the sides being inclined outwardly in the usual manner.

In the operation of drawing the lining and shell separate dies, differing slightly in size, are preferably employed. The inner lining is produced with an outturned flange 8 which extends slightly further than does a similar flange 9 which is formed on the shell. With the two components of the pan in assembled relation, the upper flange 8 of the lining also extends slightly past the shell lining 9, as indicated in Fig. 3.

Having progressed to this point, the pan in its entirety may be advantageously subjected to the action of a second die which will round and bend the two flanges down, as shown in Fig. 4. The flanges are thereby curved into a channel for the reception of a wire 10 which reinforces the pan edge. After placing the wire in this channel, the flanges are bent further around so as to substantially enclose the wire, as indicated in Fig. 2. It will be noted that the flange 8 which is the longer, is required to bend through a curvature of greater radius with the consequence that its overlap relative to the flange 9 disappears in this final operation.

In the pan herein described, the two plies are in contact over substantially every portion of their engaging surfaces. Due to the trapping of a slight amount of air between the lining and shell, there is a tendency for a slight separation between these parts, and this is increased as the air expands when the pan is subjected to heat, the result being that its conductivity is lessened. To meet this contingency, I may provide in the shell certain openings 11, arranged both in the sides and bottom if desired, for the escape of air so trapped. The air would have practically no opportunity to escape otherwise, due to the tight connection between the plies at its edges.

The construction herein described may optionally be altered, a suggestive modification being set forth in Fig. 5. In this case I dispense with the rolled edge, and in lieu thereof bend the lining flang 8 sharply around so as to clamp upon the shell flange 9 from opposite sides thereof. In this construction the two components of the pan are locked securely as in the construction first described.

One of the great advantages resulting from the present invention is that a thin sheet of aluminum, which is relatively expensive but weak, may be combined with a sheet of tin or steel which is relatively strong and inexpensive, to produce a unitary pan which is more desirable from a baker's standpoint than one which is made wholly of tin or steel. This is due in part to the fact that aluminum requires little or no greasing for baking operations, and is not subject to oxidation as are the plans of the ordinary kind, and when reinforced by a shell of tin or steel, will withstand usage as effectively as will the conventional pan of tin or steel. It is also advantageous to form the shell and lining of slightly different sizes such that one may fit snugly within the other to present substantially its entire surface in contact therewith. While these parts, if drawn from the same die, could be so fitted together, the resulting bulging and distorsion, particularly of the weaker lining, would prevent the smooth even contact which is desirable for heat conduction purposes, so that I prefer that the lining should be slightly less in size than its protective shell.

I claim:

1. A two-ply baking pan of metal in which is combined an inner lining and an outer shell each formed with a bottom and upstanding sides inseparably and immovably connected, the two plies being in intimate contact throughout substantially every portion of their bottom and sides, there being vents provided in the outer shell for the escape of air trapped between the plies, substantially as described.

2. A two-ply baking pan in which is combined an inner lining of aluminum and an outer protecting shell of sturdier metal, the two plies being each formed to provide a bottom and upstanding sides having their edges interlocked to prevent separation and movement of the plies relative to each other, the contiguous surfaces of the sides and bottom being in contact throughout substantially every portion thereof, there being vents provided in the outer shell for the escapement of air trapped between the plies, substantially as described.

3. The two-operation method of forming a bi-metallic baking pan of two plies one of which is nested within and in surface contact with the other which consists first of drawing the two plies to such size as will permit one to fit snugly within the other during which operation each ply is formed with an outturned flange, the one on the inner ply being extended the further, and thereafter in interlocking the flanges to thereby secure the one ply inseparably within the other, substantially as described.

4. The two-operation method of forming a bi-metallic two-ply baking pan which consists first in drawing two plies to such size that one may fit snugly within and in surface contact with the other, and in forming each ply with an outturned flange, and thereafter in wrapping both flanges about a wire to interlock the two plies inseparably and immovably, substantially as described.

ALBERT COHN.